Oct. 19, 1954     E. W. HAWKINSON     2,692,001
REPAIR PLUG FOR PNEUMATIC TIRE CASINGS
Filed June 18, 1952
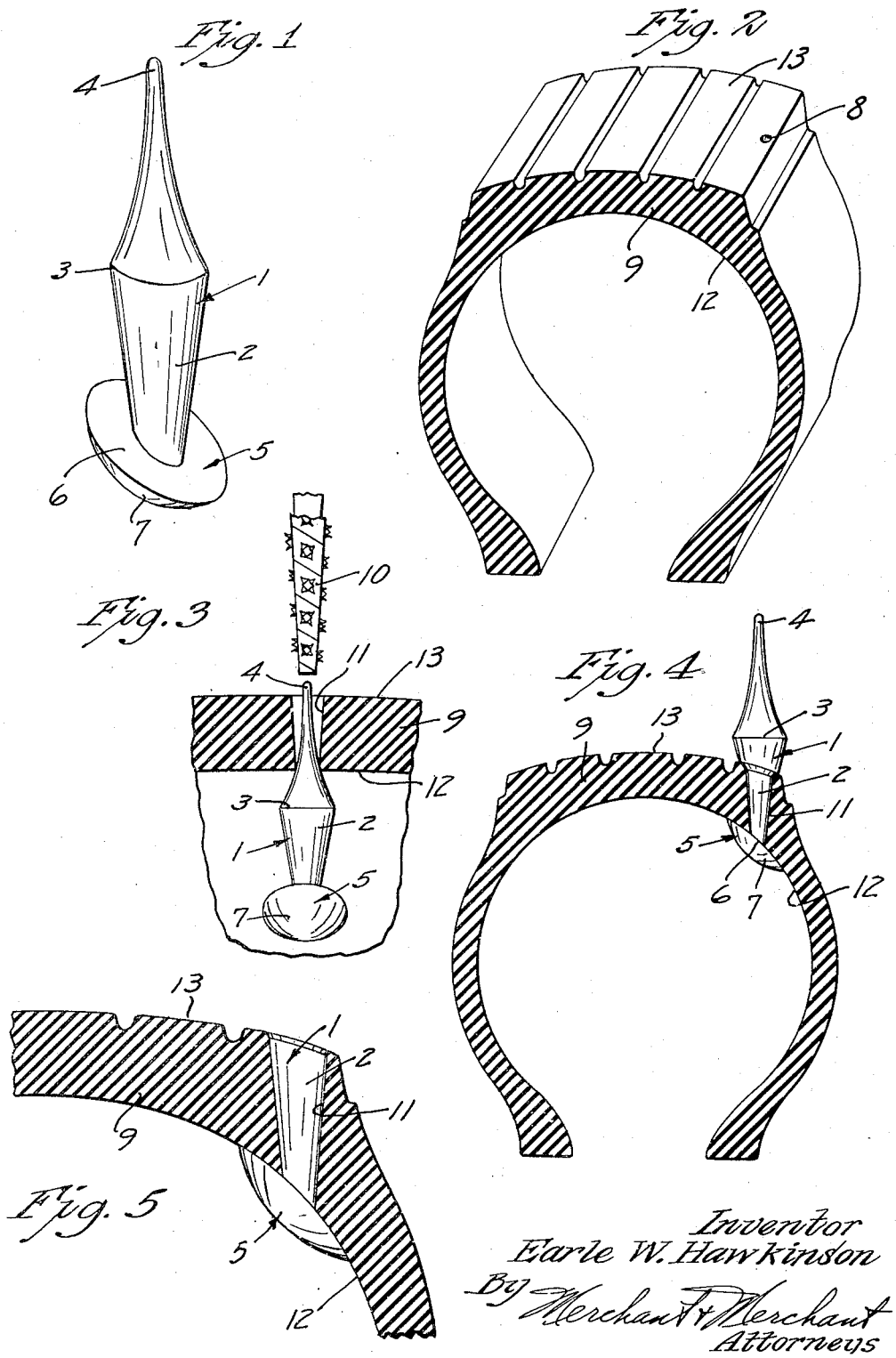
Inventor
Earle W. Hawkinson
By Merchant & Merchant
Attorneys

Patented Oct. 19, 1954

2,692,001

UNITED STATES PATENT OFFICE 2,692,001

REPAIR PLUG FOR PNEUMATIC TIRE CASINGS

Earle W. Hawkinson, Minneapolis, Minn., assignor to Paul E. Hawkinson Company, Minneapolis, Minn., a corporation of Minnesota Application June 18, 1952, Serial No. 294,243

1 Claim. (Cl. 152—370)

My invention relates to improvements in repair plugs for pneumatic tire casings, and has as its primary object the provision of a repair plug which may be used properly to repair a relatively small opening through the casing, which opening does not extend radially of the cross-sectional axis of the tire casing.

Repair plugs heretofore produced, have been provided with enlarged heads which project laterally outwardly from the axis of the plug at right angles. Such repair plugs have proven to be satisfactory where the nail hole or other small opening through the tire casing is radial to the cross-sectional axis of the casing. In such cases the enlarged head comes into contact with the inside of the casing throughout the entire area surrounding the opening. However, where the nail hole or other opening does not extend radially of the cross-sectional axis of the casing, then and in that event the head does not engage the interior of the casing uniformly throughout the area surrounding the opening, because the hole, and consequently the plug, is not at right angles to the surface adjacent the opening of the hole. To overcome this I provide a plug having an enlarged head with a flat under surface and a convex outer surface the flat under surface being at an oblique angle to the axis of the plug. In other words, the head is "cocked" with respect to the axis of the plug. Such a plug may be used satisfactorily to fill in or repair a small opening in a casing where the hole or opening extends other than radially of the cross-sectional axis of the casing.

The construction, use and advantage of my invention will be further described and clarified from the following detailed description, appended claim and attached drawings.

Referring to the drawing wherein like characters indicate like parts throughout the several views, Fig. 1 is a view in perspective of my novel plug;

Fig. 2 is a view showing in perspective a section of a tire casing having a hole therein of the type and size capable of being repeaired by my novel plug;

Fig. 3 is an enlarged fragmentary view partly in section and partly in side elevation illustrating the method of applying my novel plug to a tire casing;

Fig. 4 is a view partly in section and partly in side elevation showing my novel plug inserted into an enlarged hole made in the tire casing; and Fig. 5 is an enlarged fragmentary view corresponding to Fig. 4 but showing the outer tip of the plug cut away.

Referring with greater particularity to the drawings the numeral 1 indicates in its entirety my novel plug having a cross-sectionally circular body portion 2. Body 2 has a maximum diameter intermediate its ends, as indicated at 3, and tapers therefrom in opposite directions and terminates in a point 4 at one end, and an enlarged head 5 at the opposite end. Head 5 is provided with a flat under surface 6 and a concave outer surface 7. As shown the flat surface 6 intersects the longitudinal axis of the body 2 at an oblique angle, for a purpose which will hereinafter become apparent.

When it is desired to insert my novel plug 1 into a hole or opening 8 in a tire casing 9—which hole or opening does not extend radially of the cross-sectional axis of said casing, I preferably first clean out the said opening by use of a tapered tool 10, preferably of the type more fully illustrated in my Patent No. 2,561,472. This leaves an enlarged circular outwardly tapering opening 11 into which the pointed end 4 of the plug 1 is inserted from the inside of the casing 9, after the opening has first been saturated with rubber cement. The point 4 is then gripped by pliers or the like and pulled into the hole 11 as shown in Fig. 4. It will be noted that the plug 1 has been positioned so that the flat under surface 6 is in contact with the entire area of the inner surface 12 of the casing 9 around the opening 10. Thereafter, as shown in Fig. 5, the portion of the plug 1 which projects outwardly beyond the road engaging surface 13 of the tire 9 is cut away flush with said surface 13.

The plug 1 with the integrally formed head 6 may be molded from either synthetic or natural rubber or other suitable material.

What I claim is:

A unitary rubber plug for the repair of holes in a pneumatic tire casing which holes extend non-radially through the casing wall, said plug comprising an elongated cross-sectionally circular body, said body having a maximum thickness intermediate its ends and tapering in opposite directions therefrom, one end of said body terminating in a point, and the other end terminating in an enlarged head, said head having a flat under surface and a convex outer surface, said flat under surface intersecting the axis of the body of said plug at an oblique angle, whereby when the plug is inserted into a non-radial hole in the tire casing, the said flat under surface of the head will come into contact with the inside of the casing wall throughout the entire area surrounding the hole.

References Cited in the file of this patent

UNITED STATES PATENTS

| Number | Name | Date |
|---|---|---|
| 825,287 | Apstein | July 10, 1906 |
| 852,716 | Hall | May 7, 1907 |
| 1,831,000 | Hawkinson | Nov. 10, 1931 |
| 2,230,660 | Wedler | Feb. 4, 1941 |

FOREIGN PATENTS

| Number | Country | Date |
|---|---|---|
| 523,337 | Great Britain | July 11, 1940 |